United States Patent Office 3,104,507
Patented Sept. 24, 1963

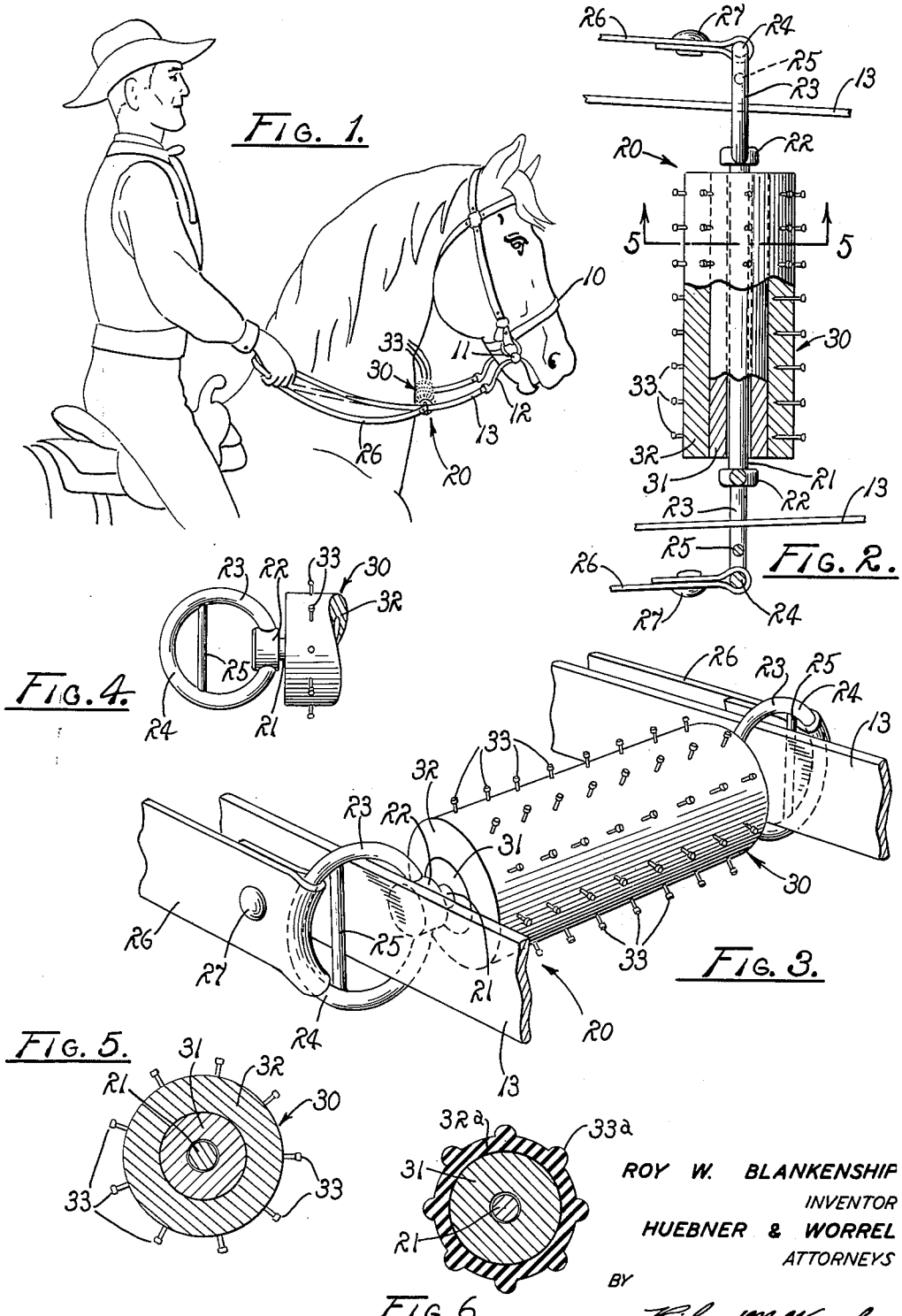

3,104,507
EQUINE TRAINING DEVICE
Roy W. Blankenship, Rte. 1, Box 114, Tipton, Calif.
Filed June 26, 1961, Ser. No. 119,681
3 Claims. (Cl. 54—71)

This invention relates generally to devices for use in the training of horses which preclude the possibility of any injury to the horse incident to such use. It particularly relates to a device for use in conjunction with a conventional bridle in the training of riding horses.

In developing well-trained riding horses, most trainers are patient in their methods. Their primary purpose in training is to teach the horse to respond quickly and correctly. Good trainers do not injure the horse's mouth while using a conventional bridle during the training period, however, many of the severe Western bits can be injurious. Excessive use of such severe bits can seriously injure the bars of a horse's mouth, and it is almost impossible to develop a good reining and pleasant riding horse if such an injury has occurred. Injured bars cause a horse to toss his head to relieve the pain caused by the pressure of the bit. He may then develop bad habits in riding, such as shaking the head, throwing the head, rearing, and other objectional habits. Such a horse is referred to as a "hard-mouthed" or "cold-jawed" horse and attempts to get away from the pain by pulling on the bit and running.

Accordingly, it is the principal object of the present invention to provide a device for the training of riding horses which is extremely effective but will not cause any injury whatsoever to the horse.

Another object of the invention is to provide a training device adaptable for use with a conventional bridle in such a manner that the horse can detect neither the presence nor absence of the device when not in use by the trainer.

Another object of the invention is to provide a training device which is effective, not only during the training period, but has a lasting effect on the horse on which the device is used.

A further object of the invention is to provide a training device for riding horses which may be used separately or in conjunction with a conventional bridle.

These, together with other objects, will become more fully apparent upon reference to the following description and accompanying drawings.

In the drawings:

FIG. 1 is a fragmentary pictorial view of a riding horse and trainer using the device of the present invention.

FIG. 2 is an enlarged fragmentary plan view of the training device with portions broken away and illustrated partially in section for illustrative convenience.

FIG. 3 is a perspective view of the training device with portions fragmentarily shown for illustrative convenience.

FIG. 4 is a fragmentary view in front elevation of one end of a roller of the training device.

FIG. 5 is a transverse section taken on line 5—5 of FIG. 2.

FIG. 6 is similar to FIG. 5 but shows an alternative construction of the roller of the present invention.

Referring to FIG. 1, a horse with his trainer up, is shown wearing a conventional bridle 10 of the type referred to as a standard Western riding bridle. The bridle includes a bit 11 provided with depending shanks 12 to which are attached the bridle reins 13 for manipulation by the trainer. It is the essence of good horsemanship to develop a riding technique which includes a very light and sensitive touch with respect to the force exerted on the horse's mouth through the reins and the bit. Since many Western riding horses are trained to respond to such a light control force on the reins, the training device of the present invention is extremely useful in training such horses.

The equine training device embodying the present invention is indicated generally in FIG. 1 by the numeral 20. The structural details of the device, as can be seen more clearly in FIG. 2, comprise an elongated axle element 21 to which is secured, at the opposite ends thereof, abutment members 22 which define the effective length of the axle. Each of the abutment members is provided with an inner loop portion 23, which is slidably carried on the conventional reins 13. An outboard loop portion 24 of the abutment members is separated from the inner loop by means of a strut 25. A pair of auxiliary reins 26 is secured to each of the outboard loop portions as by means of rivets 27. With this construction, it can be seen that either the conventional or the auxiliary reins can be manipulated by the trainer at a given time without interference from the other set of reins.

A roller indicated generally at 30 is rotatably mounted on the axle element 21. The length of the roller, being less than the effective length of the axle, permits slight relative axial movement between element 21 and the roller 30. The roller includes an inner core 31 on which is fixed an outer sleeve 32. The outer sleeve is provided with a plurality of radially projecting peripheral nubs 33 which are blunted at their outermost extremity. The degree of bluntness should be such that it is impossible to cause any injury to the horse when the training device is pulled into contact by means of the auxiliary reins 26.

As shown in FIG. 5, the outer sleeve 32 may be formed from wood, or other lightweight material, into which are driven short metal brads to serve as the peripheral projections 33. The projecting length of the brads should not be so great as to be capable of injuring the horse, and it is preferred that all projections are of a substantially uniform length.

An alternative construction is shown in FIG. 6 in which the inner core 31 is rotatably mounted on the axle 21, as in FIG. 5. The outer sleeve 32a is constructed of rubber or other like elastomer material and formed with integral nubs 33a which project radially from the periphery of the sleeve. The inside diameter of the sleeve should be slightly less than the outside diameter of the core 31 so that the sleeve will firmly encircle the core in a relatively fixed relationship.

Operation

The operation of the described embodiment of the subject invention is believed to be readily apparent and is briefly summarized at this point. During the training of a riding horse, the device 20 of the present invention can be used separately; however, a greater degree of success can be enjoyed if the device is used in conjunction with the reins of a conventional bridle. As shown in FIG. 1, the device 20 can be allowed to be suspended on the bridle reins 13 so that it is spaced from the neck of the horse. In this position, the horse is not aware of the presence of the device, and its presence does not interfere with normal use of reins 13.

Subsequent use of the training device is quite flexible, and no precise manner can be stated since each trainer will vary its use. However, the roller 30, provided with the peripheral projections 33, is used generally as a means to indicate to the horse that a particular action is undesired. By pulling on the auxiliary reins 26, the roller 20 will contact the horse with the desired degree of pressure and the training device will assume the position shown in dashed lines in FIG. 1. If unequal tension is exerted on either of the reins 26, the relative axial movement permitted between the axle 21 and roller 20 precludes the possibility of pulling the device transversely of the neck of the horse which might injure the skin over that portion. As soon as the desired control of the horse has been achieved by the trainer, the auxiliary reins will be released to assume the position shown in full lines and allow the training device to ride free from contact with the horse's neck. Judicious application of the training device promptly upon the exhibition of an undesirable trait by the horse soon corrects such behavior in the horse. Since the horse is never aware of the presence or the absence of the training device, such use of the roller by means of the auxiliary reins has a more or less permanent effect on the horse.

The device can also be used for effective control of a horse during mounting and dismounting, as well as backing the horse, as from a transport trailer. Those persons familiar with the training of horses will choose strategic times for application of the device; however, it can be used as frequently as desired without any danger of injury to the animal.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A training device for use with a conventional bridle having a pair of conventional reins comprising a rigid axially extended element disposed between the conventional reins; a roller mounted for rotation on said element and having a periphery provided with a multiplicity of blunt nubs adapted for contact with the horse without danger of injury; support means slidably carrying each end of said element on the conventional reins; and separate control means secured to said support means for selectively applying the roller to the horse independently of the normal control exercised through the bridle reins.

2. A training device for horses for use with a conventional bridle having a pair of conventional reins comprising a roller mounted for rotation on an axle extended between said reins; abutment members secured to each end of the axle to provide limited axial movement of the roller, including a first loop portion for slidably receiving the conventional reins to support said axle; and a second loop portion separated from said first loop; and auxiliary reins secured to said second loop portion outboard of the conventional reins to permit independent operation of either set of reins, said roller having a periphery provided with a plurality of blunt projections adapted to contact the horse in a non-injurious manner.

3. An equine training device adapted for use with the reins of a conventional bridle and comprising an elongated, cylindrical member having a peripheral surface provided with a plurality of blunted, radially projected protuberances; an axle element rotatably supporting the cylindrical member; abutment members secured to opposite ends of the axle element and each including a separate loop portion for loosely and slidably receiving the conventional reins and to permit the cylindrical member normally gravitationally to be biased away from the horse, and also including a separate attachment portion removed from said separate loop portion; and auxiliary reins secured to said separate attachment portion to permit independent operation of either set of reins.

References Cited in the file of this patent

UNITED STATES PATENTS

| | | |
|---|---|---|
| 369,490 | Williams et al. | Sept. 6, 1887 |
| 531,753 | Smith | Jan. 1, 1895 |
| 1,201,091 | Paulson | Oct. 10, 1916 |
| 2,097,611 | Adams | Nov. 2, 1937 |
| 2,853,052 | Pearson | Sept. 23, 1958 |

FOREIGN PATENTS

| | | |
|---|---|---|
| 5,897 | Great Britain | of 1887 |